Patented Oct. 20, 1953

2,656,379

UNITED STATES PATENT OFFICE 2,656,379

CATALYTIC DECOMPOSITIONS OF FORMIC ACID IN ACETIC ACID MIXTURES WITH OTHER ORGANIC COMPOUNDS

James S. MacKenzie and Oliver H. Axtell, Jr., Corpus Christi, Tex., assignors to Celanese Corporation of America, New York, N. Y., a corporation of Delaware No Drawing. Application November 27, 1951, Serial No. 258,518

1 Claim. (Cl. 260—499)

This invention relates to the treatment of a mixture of organic compounds and relates more particularly to an improved process for the treatment of a mixture of organic compounds containing both acetic acid and formic acid whereby the formic acid content of said mixture may be substantially reduced.

An object of this invention is to provide a process for the removal of formic acid from a mixture of acetic acid and other organic compounds which contains formic acid as an undesirable impurity.

Another object of this invention is the provision of an efficient and economical process for the selective removal of formic acid from a mixture of acetic acid and other organic compounds by catalytic decomposition.

Other objects of this invention will appear from the following detailed description.

Various processes are utilized for the production of acetic acid. In certain processes involving hydrocarbon oxidation operations, the product of said processes comprises an aqueous solution of acetic acid containing a substantial proportion of other organic compounds including formic acid, acetaldehyde, methyl formate, ethyl acetate, methyl ethyl ketone, acetone and methanol. Formic acid is well known for its strongly corrosive properties. To avoid serious corrosion damage to processing equipment or the necessity for the use of costly alloy construction materials, which are inert to the action of the formic acid, the formic acid must be removed from the product mixture before the latter is separated into its various components.

We have found that formic acid may be removed from a mixture of organic compounds containing said formic acid as an undesirable impurity by vaporizing said mixture and bringing the resulting vapors into contact with a formic acid decomposition catalyst while maintaining said vapors at an elevated temperature. Catalysts which are especially effective are those normally employed for effecting dehydration or dehydrogenation reactions. A selective catalytic decomposition of the formic acid takes place on passing the vapors over the catalyst with carbon monoxide, carbon dioxide, hydrogen and water being formed as decomposition products. The acetic acid and certain other organic compounds present in the mixture, surprisingly enough, are unaffected and pass substantially unchanged through the catalyst chamber. The formic acid esters also undergo a catalytic decomposition with 70 to 80% of the formates being decomposed.

As examples of catalyst which may be employed in our novel process there may be mentioned activated alumina, thoria, titania, silica and charcoal.

Most advantageously, the vapors are maintained at a temperature of 500 to 650° F. when brought into contact with the catalyst. The velocity of the vapors relative to the catalyst bed should be adjusted so that the time of contact of the vapors with the catalyst is of the order of 0.5 to 2.0 seconds. Preferably, the contact time should be about 0.5 second when the vapors passing over the catalyst bed are heated to a temperature of about 620° F.

In order further to illustrate our invention but without being limited thereto, the following examples are given:

Example I

A mixture containing 53% by weight of acetic acid, 4% by weight of formic acid, 26% by weight of water and 17% by weight of a mixture of acetone, acetaldehyde, methyl formate, ethyl acetate, methyl ethyl ketone, and methanol is vaporized and then passed to a heater where the vapors are heated to a temperature of 620° F. The heated vapors are then passed through a catalyst bed consisting of alumina particles of about 2.8 mesh size. The rate of passage of said vapors is such that the vapors are in contact with the catalyst particles for about 0.5 second. The treated vapors are then cooled, preferably by passage through heat exchangers which may be advantageously employed to preheat further quantities of the mixture to be treated, and the vapors are then condensed. The condensate is found to consist of 54% by weight of acetic acid, 28% by weight of water, 18% by weight of the mixture of compounds indicated above and only trace quantities of formic acid.

Example II

The mixture described in Example I is vaporized and then passed to a heater where the vapors are raised to a temperature of 510° F. The heated vapors are then passed through a catalyst bed consisting of alumina particles of about 2–4 mesh size. The rate of passage of said vapors is such that the vapors are in contact with the catalyst particles for about 1.0 second. The treated vapors are then cooled, preferably by passage through heat exchangers which may be advantageously employed to preheat further quantities of the mixture to be treated and the vapors are then condensed. The condensate is found to consist of 53.8% by weight of acetic acid, 2.1% by weight of formic acid, 27.3% by weight of water and 16.8% by weight of the mixture of compounds indicated above, except for the methyl formate, 50% of which is destroyed.

*Example III*

A mixture containing 84% by weight of acetic acid, 0.5% by weight of formic acid, 8.8% by weight of water, 0.2% by weight of methyl formate, and 6.5% by weight of a mixture of acetaldehyde and various high boiling compounds is vaporized and then passed to a heater where the vapors are heated to a temperature of 525° F. The heated vapors are then passed through a catalyst bed consisting of alumina particles of about 2–4 mesh size. The rate of passage of said vapors is such that the vapors are in contact with the catalyst particles for about 2.5 seconds. The treated vapors are then cooled, preferably by passage through heat exchangers which may be advantageously employed to preheat further quantities of the mixture to be treated, and the vapors are then condensed. The condensate is found to consist of 84.3% by weight of acetic acid, 8.8% by weight of water, 0.2% by weight of formic acid, 0.1% by weight of methyl formate, and 6.6% by weight of acetaldehyde and high boiling compounds.

*Example IV*

A mixture containing 61% by weight of acetic acid, 4% by weight of formic acid and 35% by weight of water is vaporized and then passed to a heater where the vapors are heated to a temperature of 520° F. The heated vapors are then passed through a catalyst bed consisting of alumina particles of 6–8 mesh size. The rate of passage of said vapors is such that the vapors are in contact with the catalyst particles for about 1.5 seconds. The treated vapors are then cooled, preferably by passage through heat exchangers which may be advantageously employed to preheat further quantities of the mixture to be treated, and the vapors are then condensed. The condensate is found to consist of 64% by weight of acetic acid, 1% by weight of formic acid and 35% by weight of water.

It is to be understood that the foregoing detailed description is given merely by way of illustration and that many variations may be made therein without departing from the spirit of our invention.

Having described our invention what we desire to secure by Letters Patent is:

In a process for the removal of the formic acid present in an aqueous mixture of organic compounds, said mixture containing acetic acid, formic acid, acetone, acetaldehyde, methyl formate, ethyl acetate, methyl ethyl ketone and methanol, the major constituent of said aqueous mixture being acetic acid, the steps which comprise vaporizing said aqueous mixture and passing the vapors over activated alumina of 2 to 4 mesh particle size while maintaining the vapors at a temperature of 500 to 650° F. and in contact with said alumina for one second.

JAMES S. MacKENZIE.
OLIVER H. AXTELL, Jr.

References Cited in the file of this patent

Sabatier et al.: Chem. Abstracts, vol. 6, p. 619 (1912).

Chistov et al.: Chem. Abstracts, vol. 35, p. 879 (1941).

Dewar et al.: Chem. Abstracts, vol. 37, p. 4001 (1943).